US012625667B2

(12) United States Patent　　　(10) Patent No.:　US 12,625,667 B2

Eo et al.　　　(45) Date of Patent:　May 12, 2026

(54) SCREEN SHARING SERVICE PROVIDING SYSTEM AND METHOD USING EXTENSION TOOL

(71) Applicant: Inswave Co., Ltd., Seoul (KR)

(72) Inventors: Se Yong Eo, Seoul (KR); Woog Lae Kim, Seoul (KR)

(73) Assignee: INSWAVE CO., LTD., Seoul (KR)

( * ) Notice: Subject to any disclaimer, the term of this patent is extended or adjusted under 35 U.S.C. 154(b) by 0 days.

(21) Appl. No.: 19/256,152

(22) Filed: Jul. 1, 2025

(65) Prior Publication Data

US 2026/0003562 A1　　Jan. 1, 2026

(30) Foreign Application Priority Data

Jul. 1, 2024　(KR) ........................ 10-2024-0086229

(51) Int. Cl.
G06F 3/14　　　(2006.01)
(52) U.S. Cl.
CPC .................................. G06F 3/1454 (2013.01)
(58) Field of Classification Search
CPC ....... G06F 9/452; G06F 3/1454; H04L 65/403
See application file for complete search history.

(56) References Cited

U.S. PATENT DOCUMENTS 11,663,024 B2 * 5/2023 Decrop ................... G10L 15/22
715/708
2021/0089256 A1　3/2021 Lieb et al.

FOREIGN PATENT DOCUMENTS

| KR | 10-2012-0063366 A | 6/2012 | |
|---|---|---|---|
| KR | 10-2013-0021505 A | 3/2013 | |
| KR | 10-2015-0089687 A | 8/2015 | |
| KR | 10-2174392 B1 | 11/2020 | |
| KR | 10-2185800 B1 | 12/2020 | |
| KR | 10-2022-0101336 A | 7/2022 | |
| KR | 10-2525189 B1 | 4/2023 | |
| KR | 10-2660276 B1 | 4/2024 | |
| KR | 10-2681180 B1 | 7/2024 | |
| WO | WO-2025054116 A1 * | 3/2025 | ............. G06F 9/453 |

* cited by examiner

*Primary Examiner* — Koosha Sharifi-Tafreshi

(74) *Attorney, Agent, or Firm* — IP & T GROUP LLP

(57)　　　　　ABSTRACT

A system and method for providing a screen sharing service through an extension tool are disclosed. The method can be comprising: receiving a request for a screen sharing-related extension tool for installation in a web browser from a first user terminal; providing the screen sharing-related extension tool in response to the request; receiving a screen sharing request according to execution of the screen sharing-related extension tool installed in the first user terminal; transmitting a screen sharing request notification message to a second user terminal corresponding to the screen sharing request; receiving a screen sharing-enabled status notification message from the second user terminal; and transmitting the screen sharing-enabled status notification message to the first user terminal, thereby establishing a connection for screen sharing between the first user terminal and the second user terminal.

5 Claims, 15 Drawing Sheets

FIG. 4

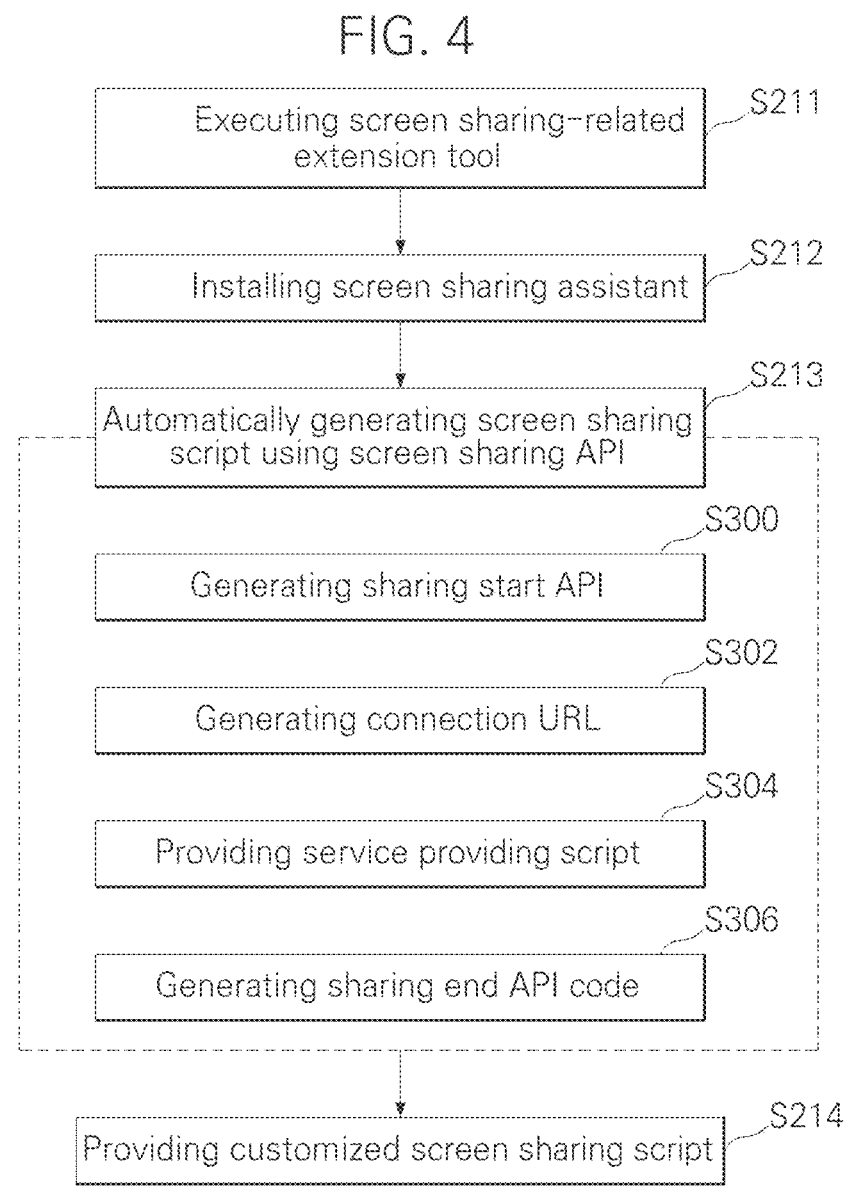

Executing screen sharing-related extension tool — S211

Installing screen sharing assistant — S212

Automatically generating screen sharing script using screen sharing API — S213

Generating sharing start API — S300

Generating connection URL — S302

Providing service providing script — S304

Generating sharing end API code — S306

Providing customized screen sharing script — S214

FULL SHARING

SHARING USER

PARTIAL SHARING

CAPTURING IMAGE
USING CAMERA

STORING IMAGE
&
VOICE DATA

RECORDING VOICE
USING MICROPHONE

FIG. 12

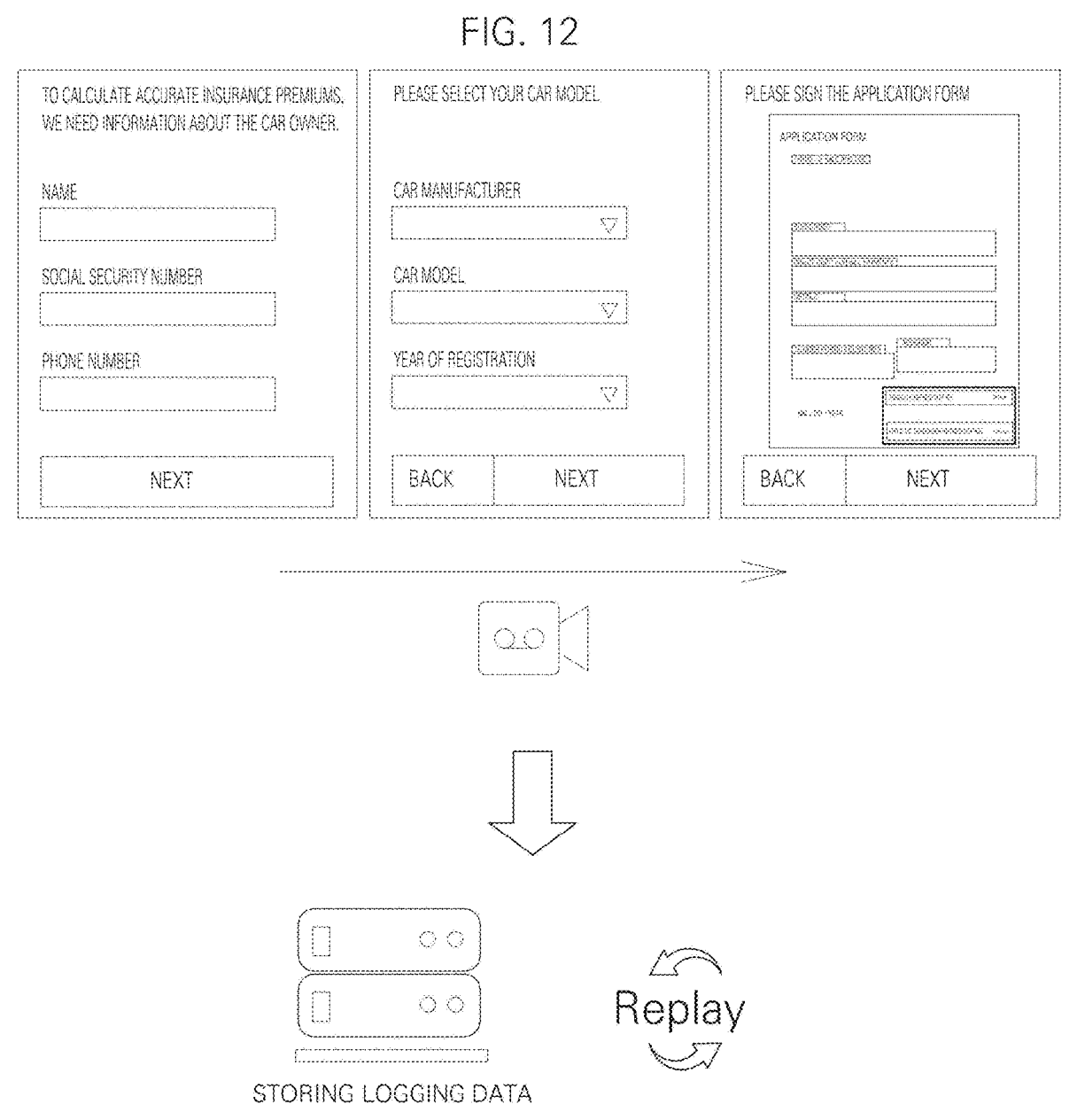

| TO CALCULATE ACCURATE INSURANCE PREMIUMS, WE NEED INFORMATION ABOUT THE CAR OWNER. | PLEASE SELECT YOUR CAR MODEL | PLEASE SIGN THE APPLICATION FORM |
|---|---|---|

NAME

SOCIAL SECURITY NUMBER

PHONE NUMBER

NEXT

CAR MANUFACTURER

CAR MODEL

YEAR OF REGISTRATION

BACK    NEXT

APPLICATION FORM

BACK    NEXT

STORING LOGGING DATA

Replay

SHARING USER            MULTIPLE VIEWER USER

FIG. 15

SCREEN SHARING SERVICE PROVIDING SYSTEM AND METHOD USING EXTENSION TOOL

CROSS-REFERENCE TO RELATED APPLICATION

The present application claims priority under 35 U.S.C. § 119(a) to Korean application number 10-2024-0086229, filed on Jul. 1, 2024, in the Korean Intellectual Property Office, which is incorporated herein by reference in its entirety.

BACKGROUND

The present invention relates to screen sharing service providing system and method using extension tool.

Digital transformation has been in the spotlight recently. Digital transformation means that our lives and business works are being converted to digital using new digital technologies.

Companies/organizations are changing to using the cloud to provide services without having to configure their own servers or operating environments. Using a cloud service means that data or resources exist on an external cloud.

This is bringing about a change to a new work environment of diverse collaboration and sharing through mobile devices such as smartphones, and the need for work programs capable of supporting collaboration and sharing is rapidly increasing to adapt to this.

Currently, the market is divided into platforms for mobile app development and desktop application platforms. In the mobile ecosystem, with the emergence of incompatible mobile operating systems such as Apple's iOS and Google's Android, the burden of developing separate applications for specific operating systems has increased, and hybrid apps, which can efficiently and easily create a single app that can run on multiple platforms such as IOS, Android, and Windows with a single development effort, have begun to attract attention.

In addition, the recent increase in non-face-to-face remote services requires work processes suitable for them.

The background described above is technical information that the inventor possessed for the purpose of deriving the present invention or acquired during the reduction of the present invention to practice, and cannot necessarily be said to be a publicly known technology disclosed to the general public prior to the application of the present invention.

SUMMARY

The present invention is intended to provide a screen sharing service providing system and method using an extension tool, which provide a screen sharing function as an extension tool of a web browser, thereby allowing even non-developers to easily share the current web page with other users.

The present invention provides is intended to provide a screen sharing service providing system and method using an extension tool, which improve work efficiency by enabling remote processing of non-face-to-face work by sharing a screen, such as a user interface block implemented on the Web, between users.

Other objectives and advantages will be easily understood from the following description.

According to one aspect of the present invention, there is provided a computer program stored in a computer-readable medium to perform a screen sharing service providing method using extension tool, wherein the computer program causes a computer to perform the following steps: registering a screen sharing-related extension tool in an extension tool registration unit of a web browsing service server in an extension tool providing unit of a screen sharing service server, receiving a screen sharing request according to an execution of the screen sharing-related extension tool installed in a first user terminal in a request receiving unit of the screen sharing service server, transmitting a message for notifying screen sharing request to a second user terminal corresponding to the screen sharing request in a screen sharing execution unit of the screen sharing service server, receiving a message for notifying screen sharing available state from the second user terminal in the screen sharing execution unit and transmitting the message for notifying screen sharing available state from the screen sharing execution unit to the first user terminal, thereby establishing a connection for screen sharing between the first user terminal and the second user terminal, wherein the screen sharing-related extension tool is an extension program installed in a web browser of the first user terminal, and enables the contents displayed on the screen of the web browser with the second user terminal, wherein the first user terminal requests the web browsing service server for the screen sharing-related extension tool for installation in the web browser and receives the screen sharing-related extension tool.

When the screen sharing-related extension tool is executed on the first user terminal, installing a screen sharing assistant, automatically generating a screen sharing script using a screen sharing API in the screen sharing assistant and providing a customized screen sharing script customized to the contents displayed on the screen of the web browser, based on a response provided in connection with an LLM to a user query for modification of the screen sharing script input through a chat client provided by the screen sharing assistant, may be further included.

The screen sharing script may include at least one of a sharing start API code, a connection URL, a service providing script, and a sharing end API code.

The computer program may further include receiving the user query through the chat client provided by the screen sharing assistant, generating a context by calling context information corresponding to a category corresponding to the user query, generating a prompt for LLM by calling a service module according to the category and adding the context to a service-specific prompt provided by the service module, querying a large language model for the LLM prompt through an LLM interface and receiving a response accordingly and after validating the response, providing the response to the chat client as a response to the user query.

The transmitting a message for notifying screen sharing request to a second user terminal may provide a connection URL included in the screen sharing script, and the second user terminal may transmit the message for notifying screen sharing available state after accessing a web page through the connection URL.

According to another aspect of the present invention, there is provided a screen sharing service server using extension tool including an extension tool providing unit, configured to provide a screen sharing-related extension tool to a web browsing service server to register in an extension tool registration unit, a request receiving unit, configured to receive a screen sharing request according to an execution of the screen sharing-related extension tool installed in a first user terminal, a screen sharing execution unit, configured to transmit a message for notifying screen sharing request to a second user terminal corresponding to the screen sharing request, receive a message for notifying screen sharing available state from the second user terminal, and transmit the message for notifying screen sharing available state to the first user terminal, thereby establishing a connection for screen sharing between the first user terminal and the second user terminal, wherein the screen sharing-related extension tool is an extension program installed in a web browser of the first user terminal, and enables the contents displayed on the screen of the web browser with the second user terminal, wherein the first user terminal requests the web browsing service server for the screen sharing-related extension tool for installation in the web browser and receives the screen sharing-related extension tool.

When the screen sharing-related extension tool is executed on the first user terminal, a screen sharing assistant is installed, a screen sharing script is automatically generated using a screen sharing API in the screen sharing assistant, and a customized screen sharing script customized to the contents displayed on the screen of the web browser is provided, based on a response provided in connection with an LLM to a user query for modification of the screen sharing script input through a chat client provided by the screen sharing assistant.

The screen sharing script may include at least one of a sharing start API code, a connection URL, a service providing script, and a sharing end API code.

The screen sharing service server may further include AI (Artificial intelligence) chatbot response unit, configured to generate a context by calling context information corresponding to a category corresponding to the user query, which is received through the chat client provided by the screen sharing assistant, generate a prompt for LLM by calling a service module according to the category and adding the context to a service-specific prompt provided by the service module, query a large language model for the LLM prompt through an LLM interface and receive a response accordingly, and after validating the response, provide the response to the chat client as a response to the user query.

Other aspects, features and advantages other than those described above will become apparent from the following drawings, claims and detailed description of the invention.

According to one embodiment of the present invention, it is advantageous to provide a screen sharing function as an extension tool of a web browser, thereby allowing even non-developers to easily share the current web page with other users.

It is also advantageous to improve work efficiency by enabling remote processing of non-face-to-face work by sharing a screen, such as a user interface block implemented on the Web, between users.

The effects to be obtained from the invention are not limited to those mentioned above, and other effects not mentioned will be apparent to one having ordinary skill in the art to which the invention belongs from the following description.

BRIEF DESCRIPTION OF ACCOMPANYING DRAWINGS

FIG. 1 exemplarily illustrates a screen sharing service providing system using an extension tool according to one embodiment of the present invention;

FIG. 4 is a flowchart of a method of using assistant when installing the extension tool according to one embodiment of the present invention;

Figure 8:
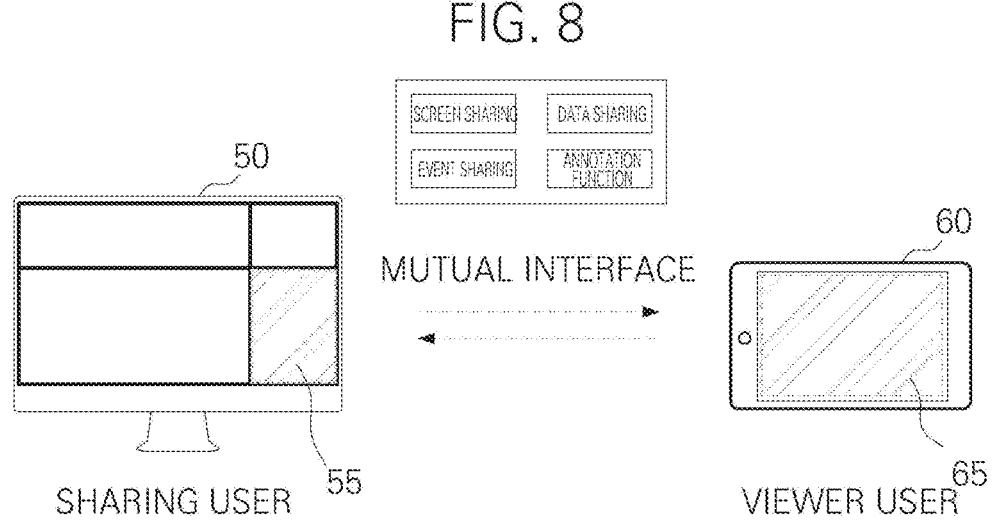
Figure 9:
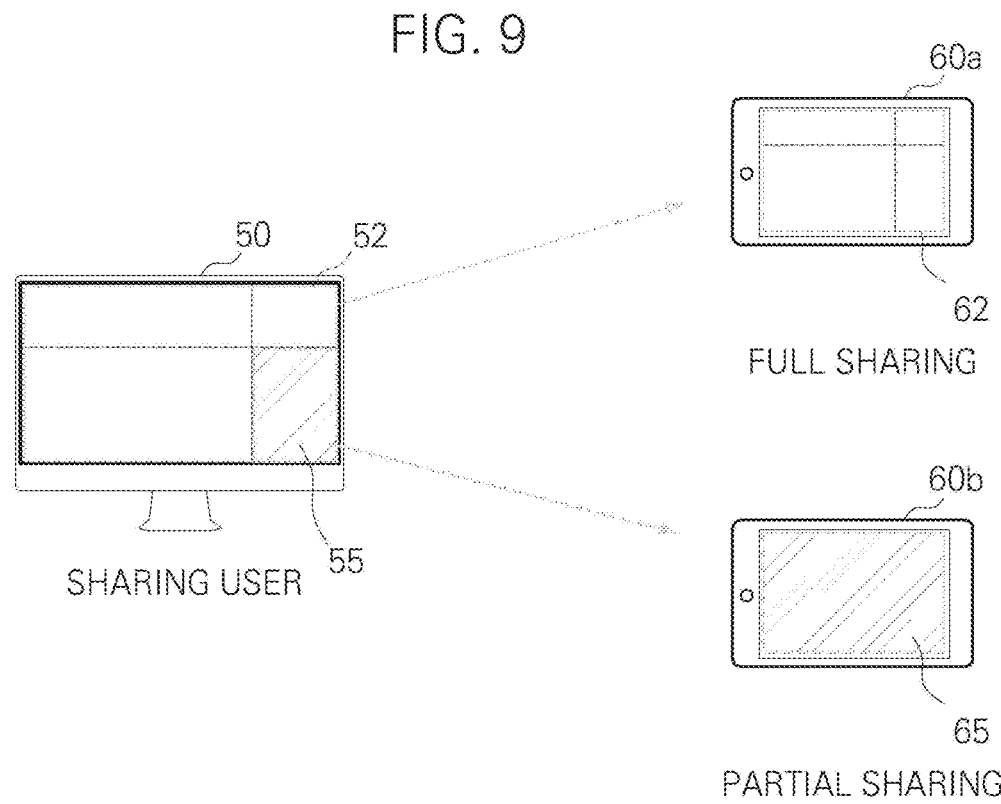
Figure 10:
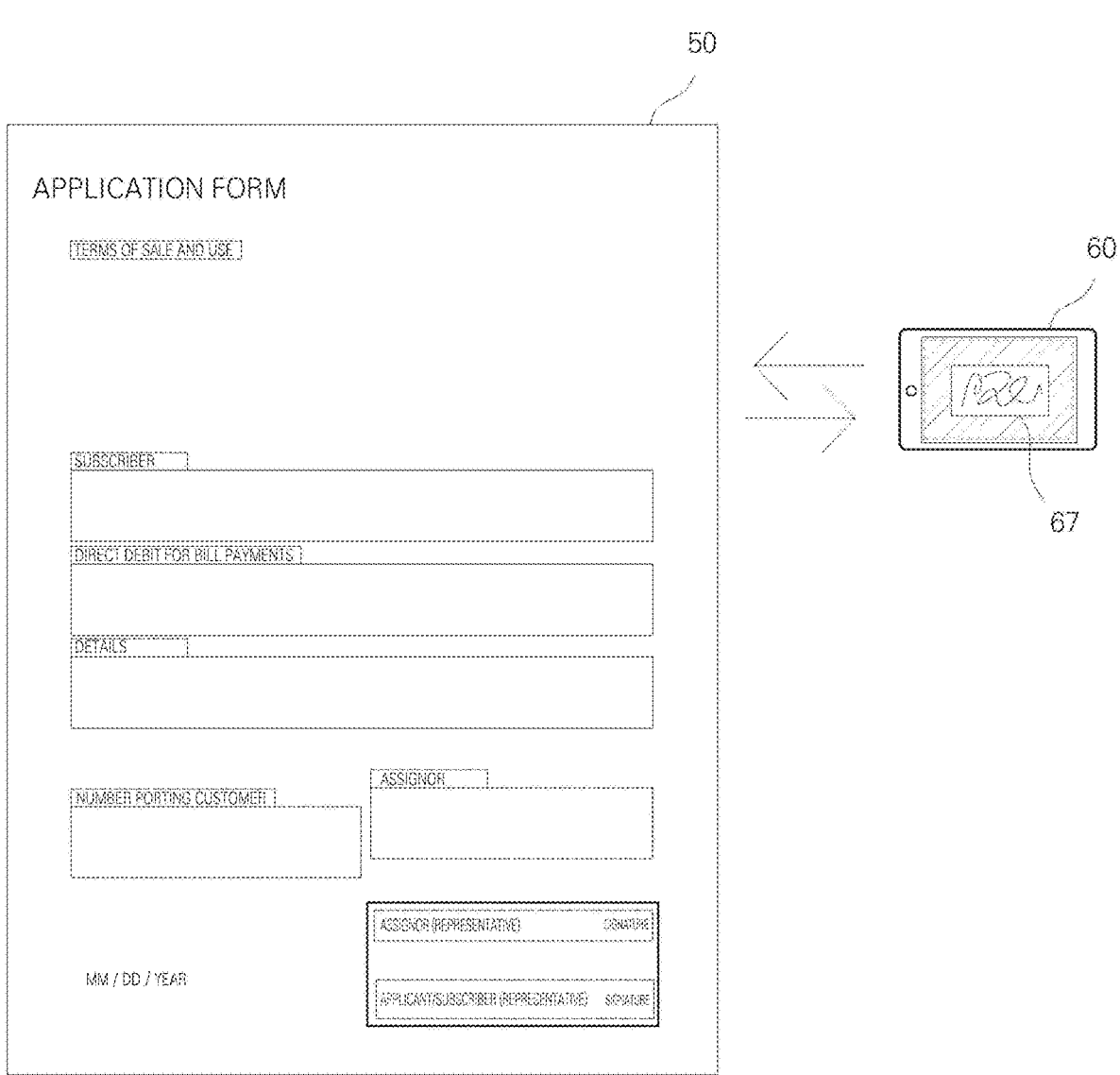
Figure 11:
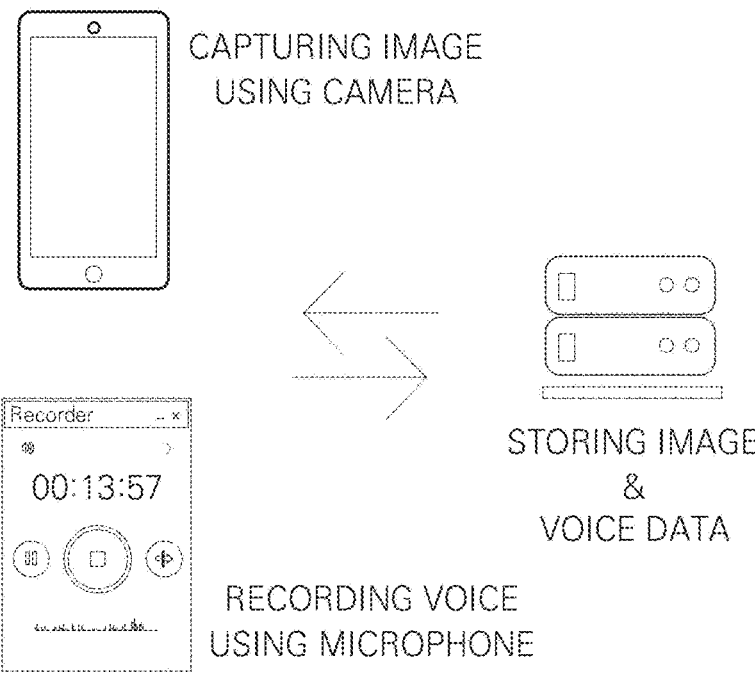
Figure 13:
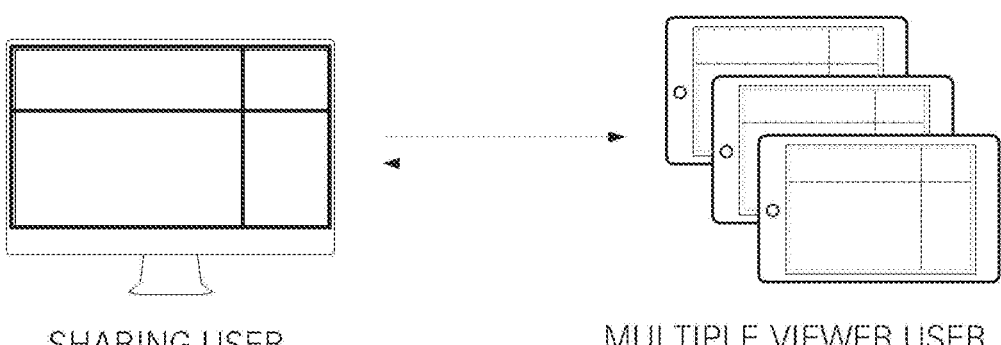
Figure 14:
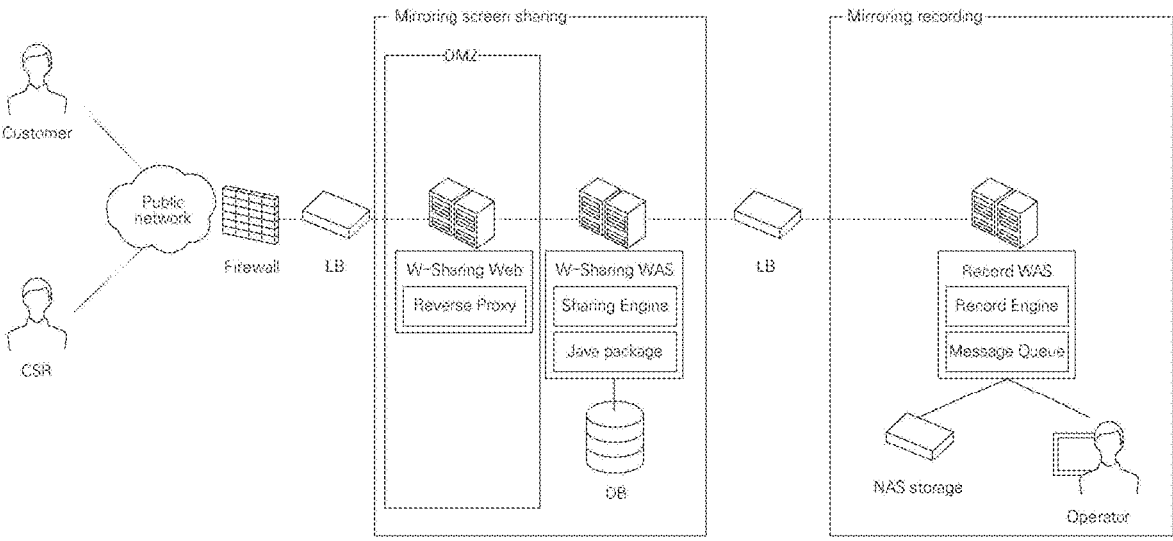

FIG. 8 exemplarily illustrates the non-face-to-face remote work processing system through screen sharing;

FIG. 9 exemplarily illustrates full sharing and partial sharing;

FIG. 10 exemplarily illustrates signature data sharing;

FIG. 11 exemplarily illustrates image and voice data sharing;

FIG. 12 exemplarily illustrates history logging and replay function;

FIG. 13 exemplarily illustrates multiple sharing;

FIG. 14 exemplarily illustrates a screen sharing service; and

Figure 15:
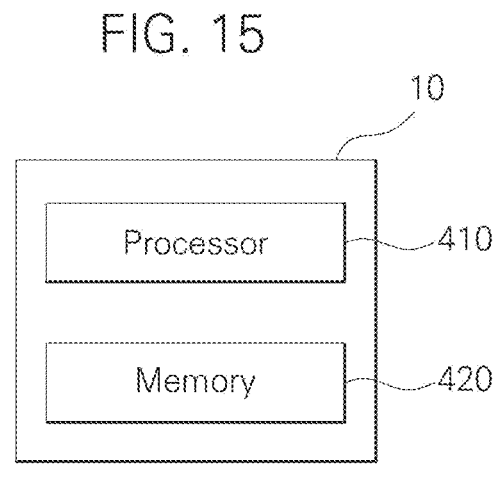

FIG. 15 exemplarily illustrates the configuration of a system according to one embodiment of the present invention.

DETAILED DESCRIPTION

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

As used herein, a "unit" includes a unit realized by hardware, a unit realized by software, and a unit realized by both. Further, one unit may be implemented using two or more hardware, or two or more units may be implemented using one hardware. In addition, the term "unit" is not meant to be limited to software or hardware, and the "unit" may be configured to reside on an addressable storage medium or may be configured to execute one or more processors. Thus, in one example, "~unit" may include components, such as software components, object-oriented software components, class components, and task components, processes, functions, properties, procedures, subroutines, segments of program code, drivers, firmware, microcode, circuits, data, databases, data structures, tables, arrays, and variables. The functionality provided within the components and "~units" may be combined into fewer components and "~units" or further separated into additional components and "~subunits". In addition, the components and "~units" may be implemented to recycle one or more CPUs in the device.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Figure 1:
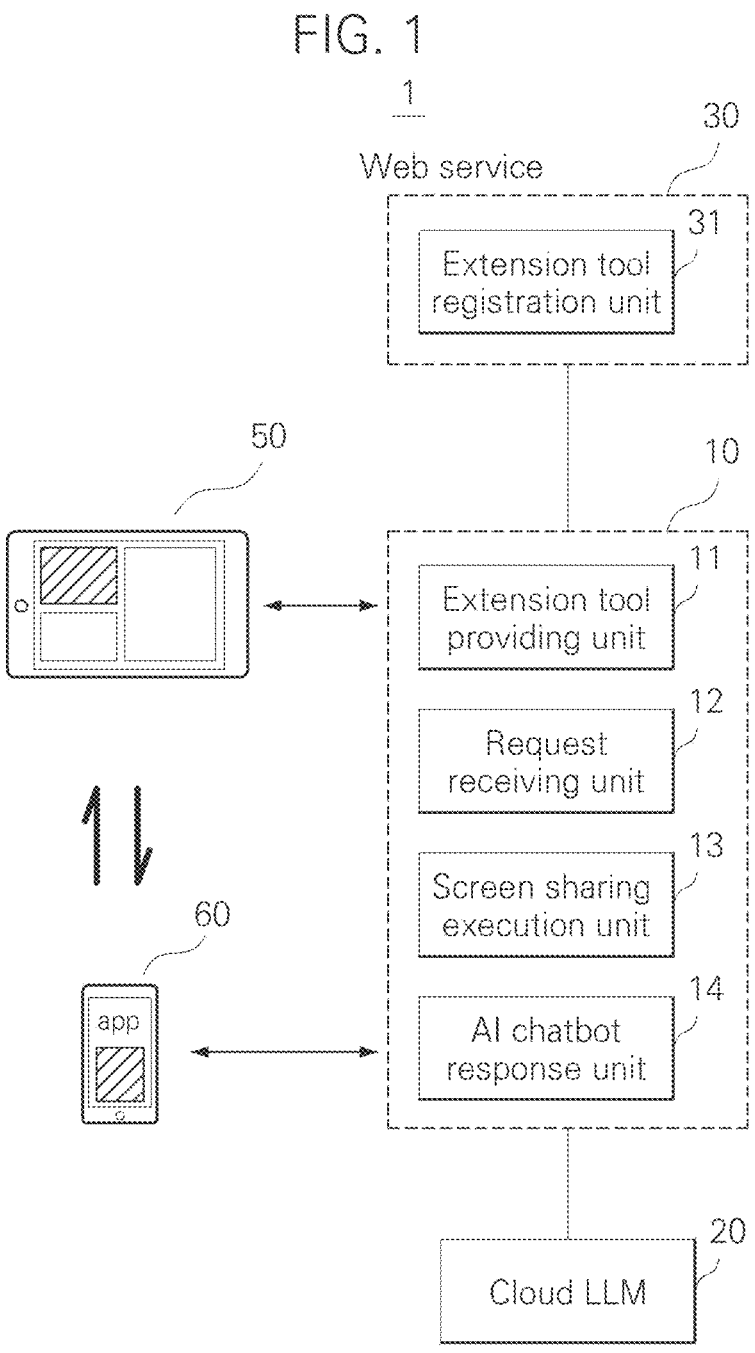

FIG. 1 exemplarily illustrates a screen sharing service providing system using an extension tool according to one embodiment of the present invention.

A screen sharing service providing system 1 using an extension tool according to one embodiment of the present invention registers an screen sharing-related extension tool with a web browsing service server, such as Chrome, to provide the screen sharing-related extension tool in response to a user request through a web browser, and enables sharing all or part of a screen by connecting a first user terminal and a second user terminal in response to a request for screen sharing through the extension tool.

In addition, the extension tool helps to automatically generate an API code for screen sharing, and can help users easily customize the screen sharing API while conversing using an AI (Artificial intelligence)-based chatbot.

Referring to FIG. 1, the screen sharing service providing system 1 using an extension tool may include a screen sharing service server 10, a web browsing service server 30, a first user terminal 50, and a second user terminal 60. Here, the screen sharing service server 10, the web browsing service server 30, the first user terminal 50, and the second user terminal 60 may be configured to be mutually communicatively connected to each other via a wired or wireless network.

The first user terminal 50 may be a sharing user terminal device that shares its own screen. The first user terminal 50 is a computing device capable of accessing web pages via a web browser, and may be, for example, a smartphone, a tablet PC, a notebook, a desktop PC, etc.

The second user terminal 60 is a viewer user terminal device that shares and displays the first user's screen. The second user terminal 60 is a computing device capable of accessing web pages via a web browser, and may be, for example, a smartphone, a tablet PC, a notebook, a desktop PC, etc.

The screen sharing service server 10 may provide an extension tool equipped with a screen sharing function to the web browsing service server 30 so that it may be registered with the web store (extension tool registration unit 31).

The web browsing service server 30 may communicate with the first user terminal 50, and in response to an extension tool request through the web browser of the first user terminal 50, and provide the screen sharing-related extension tool registered with the web store, thereby allowing the screen sharing function to be installed on the first user terminal 50.

Additionally, in response to a screen sharing request from the first user terminal 50 on which the screen sharing function is installed, the screen sharing service server 10 may communicate with the second user terminal 60 to view the shared screen, and transmit and receive information about screen sharing between the first user terminal 50 and the second user terminal 60, thereby enabling screen sharing to be performed between the first user terminal 50 and the second user terminal 60.

The screen sharing service server 10 may include an extension tool providing unit 11, a request receiving unit 12, and a screen sharing execution unit 13.

The extension tool providing unit 11 is configured to provide an extension tool, which is an executable program that runs on the first user terminal 50 and provides a screen sharing assistant that automatically generates a screen sharing script that is operative to share all or part of the screen between two or more user terminals 50, 60. For example, the extension tool may have the form of a plug-in that is installed in a web browser running on the first user terminal 50.

The extension tool providing unit 11 may be also configured to provide an extension tool component to the web browsing service server 30, which has a store implemented therein for uploading applications or extension tools that can be downloaded to the first user terminal 50. Alternatively, the extension tool providing unit 11 may directly transmit the extension tool to the user terminals 50, 60.

The request receiving unit 12 is configured to receive the screen sharing request according to the execution of the screen sharing script automatically generated through the screen sharing assistant from the first user terminal 50 on which the extension tool is installed.

When the screen sharing request from the first user terminal 50 on which the extension tool is installed is received through the request receiving unit 12, the screen sharing execution unit 13 may be activated and transmit a connection URL for screen sharing to the second user terminal 60 to view the shared screen.

When the second user device 60 accessed using the connection URL and a notification message indicating a screen sharing available state is received, the screen sharing execution unit 13 is configured to notify the first user device 50 and cause various data and images to be transmitted between the first user device 50 and the second user device 60, thereby allowing screen sharing.

Figure 2:
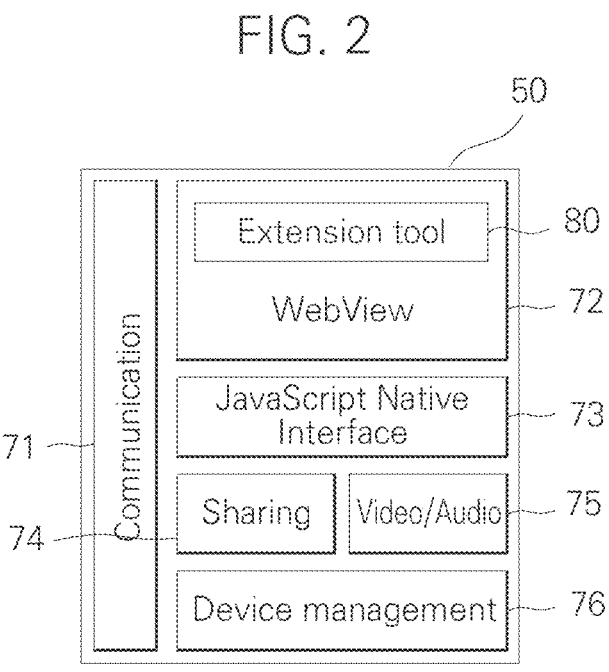
FIG. 2 is a block diagram of a terminal provided with an extension tool.

Referring to FIG. 2, a configuration block diagram of a terminal (first user terminal 50) that has been provided with the extension tool is illustrated.

The first user terminal 50 may include a communication module 71, a web view module 72, an interface module 73, a sharing module 74, a video/audio module 75, and a device management module 76.

The communication module 71 is configured to communicate with the screen sharing service server 10 and/or the web browsing service server 30 to transmit and receive various data and files. The communication module 71 may include a mobile communication device such as 3G, 4G, or 5G and/or a short-range communication device such as Bluetooth or Wi-Fi. Data and files transmitted and received through the communication module 71 may be encrypted through an encryption module (not shown) to prevent hacking, etc.

The web view module 72 is configured to display a screen according to the execution of a web browser and/or an extension tool 80. The web view module 72 may be a display module.

The interface module 73 may be a native interface, for example, a JavaScript native interface.

The video/audio module 75 is configured to support video calls or voice calls between employees and customers so that non-face-to-face (or untact) services can be provided during the service provision process. In the case of a voice call, a microphone and a speaker may be included, and in the case of a video call, a camera may be additionally included.

The device management module 76 is configured to manage devices related to screen sharing or video/audio services.

The sharing module 74 may be a screen sharing module configured to provide the screen sharing function. In addition to the screen sharing function, a data sharing function, a history logging and replay function, an event sharing function, and an annotation functions may be included.

The screen sharing function may be configured to enable remote work processing without face-to-face interaction by sharing the entire screen or part of the screen of the first user terminal 50 and displaying it in a designated area of the second user terminal 60 when a connection is established between terminals that wish to be connected in a predesignated manner. Alternatively, by switching between the sharing user and the viewer user, and displaying the entire screen or part of the screen of the second user terminal 60 in a designated area of the first user terminal 50, it may be possible for employees to smoothly perform or provide assistance to customers without having to directly handle the second user terminal 60.

Figure 3:
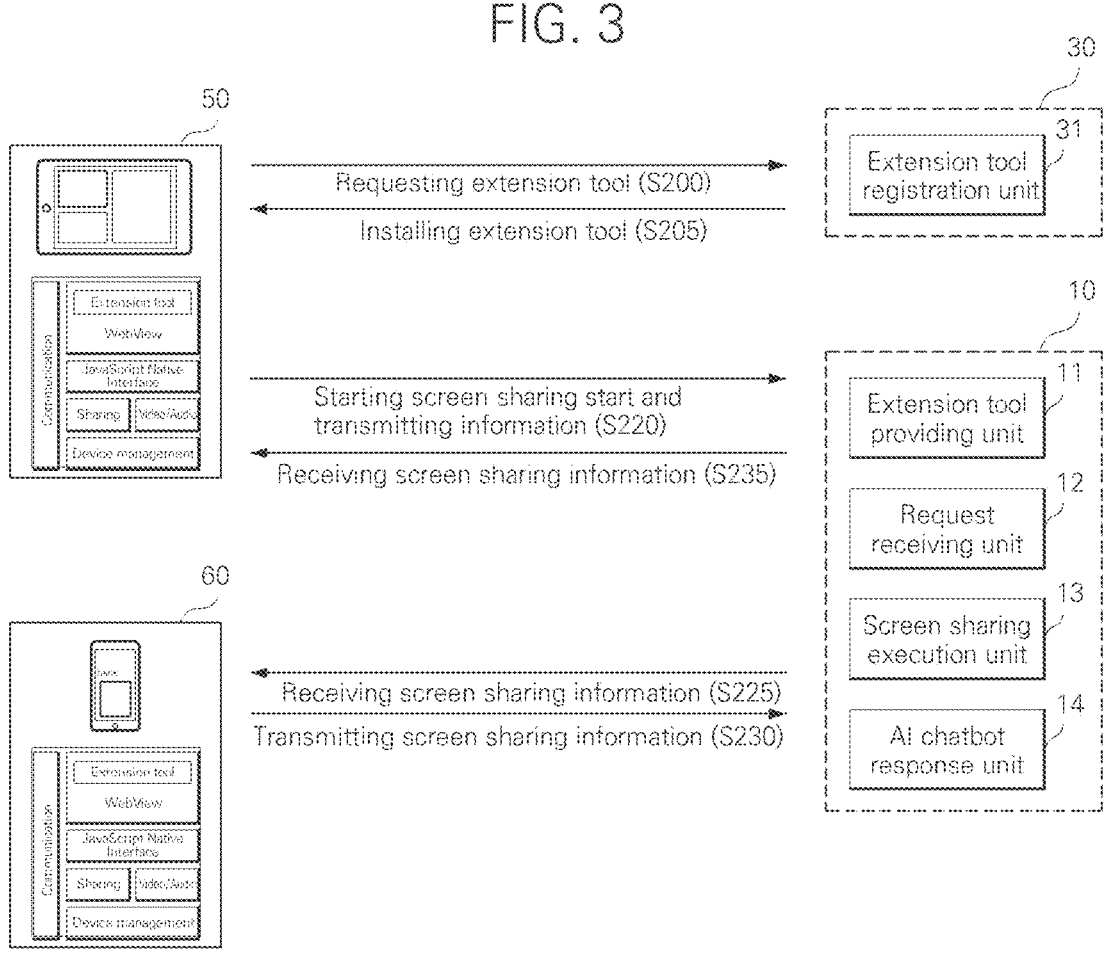
FIG. 3 is a flowchart of a screen sharing service providing method performed in the screen sharing service providing system using extension tool according to one embodiment of the present invention.

FIG. 3 is a flowchart of a screen sharing service providing method performed in the screen sharing service providing system using extension tool according to one embodiment of the present invention, and FIG. 4 is a flowchart of a method of using assistant when installing the extension tool according to one embodiment of the present invention.

In this embodiment, it is assumed that the first user terminal 50 is the sharing user terminal and the second user terminal 60 is the viewer user terminal when the first user terminal 50 wants to share the screen with the second user terminal 60.

Referring to FIG. 3, the screen sharing service server 10 registers the screen sharing-related extension tool on the web browsing service server 30, specifically in the store operated by that server, so that it can be downloaded.

In this case, the first user terminal 50 requests the web browsing service server 30 for the screen sharing-related extension tool that can be installed in a web browser running on the first user terminal 50 for screen sharing (step S200).

The extension tool registration unit 31 of the web browsing service server 30 provides the screen sharing-related extension tool corresponding to the request among the extension tools registered in the store to the first user terminal 50 for installation (step S205). The extension tool can be provided by downloading through the store.

The first user terminal 50 that has been provided with the screen sharing-related extension tool installs the extension tool as one of the extension programs of the web browser.

When the installation of the extension tool is completed, the first user terminal 50 can execute the extension tool while the web browser is running.

Referring to FIG. 4, when the screen sharing-related extension tool is executed (step S211), a screen sharing assistant for smoothly utilizing the screen sharing function can be installed (step S212). The screen sharing assistant is a software module prepared to enable even first users who are not developers to easily use the screen sharing function.

The screen sharing assistant may automatically generate a screen sharing script that allows screen sharing of the web page currently displayed through the web browser using the screen sharing API (step S213). The screen sharing script may include at least one of a sharing start API code for starting screen sharing, a sharing end API code for ending screen sharing, a connection URL for accessing a web page for screen sharing from the second user terminal 60 where an extension tool is not installed, and a service providing script for providing various related services (e.g., full screen sharing, etc.) during screen sharing (steps S300, S302, S304, S306).

The automatically generated screen sharing script can be provided to the first user terminal 50 as a customized screen sharing script for the current web browser display screen (step S214). Through the customized screen sharing script, the screen sharing can be performed with the second user terminal 60 that wishes to share the screen.

Referring to FIG. 3 again, if the screen sharing script is automatically generated through the screen sharing assistant installed through the execution of the extension tool on the first user terminal 50, by executing the screen sharing script, a screen sharing start request for screen sharing with the second user terminal 60 is transmitted along with identification information and the connection URL for the second user terminal 60 that wishes to share the screen to the screen sharing service server 10 (step S220).

The screen sharing service server 10, particularly the screen sharing execution unit 13, is configured to respond to the screen sharing start request by notifying the second user terminal 60 through a message for notifying that there is the screen sharing request, and the second user terminal 60 can receive the screen sharing request notification (step S225). The message for notifying screen sharing request may include the connection URL.

Although the second user terminal 60 does not have a program or extension tool for screen sharing installed, it can access a specific web page for screen sharing with the first user terminal 50 through the connection URL included in the message for notifying screen sharing request.

When the second user terminal 60 accessed the web page through the connection URL, by transmitting the message for notifying screen sharing available state to the screen sharing service server 10, thereby confirming that the second user terminal 60 is in the screen sharing available state. In addition, the message for notifying screen sharing available state can be transmitted to the first user terminal 50, enabling the first user terminal 50 to recognize that screen sharing is now available.

Through this process, the first user terminal 50 and the second user terminal 60 may establish a connection for screen sharing, and can enjoy the screen sharing function while transmitting and receiving information for screen sharing (e.g., various data and images, etc.) through the screen sharing service server 10 (steps S230 and S235).

The first user terminal 50 can start screen sharing by executing the sharing start API code automatically generated through the screen sharing assistant when executing the extension tool, and can end screen sharing by executing the sharing end API code. In addition, various related services (sharing of the entire web page, sharing of a portion of the web page, data sharing, history logging and replay, multi-party collaboration function, event sharing, annotation function, etc.) can be provided during screen sharing through the service providing script.

Figure 5:
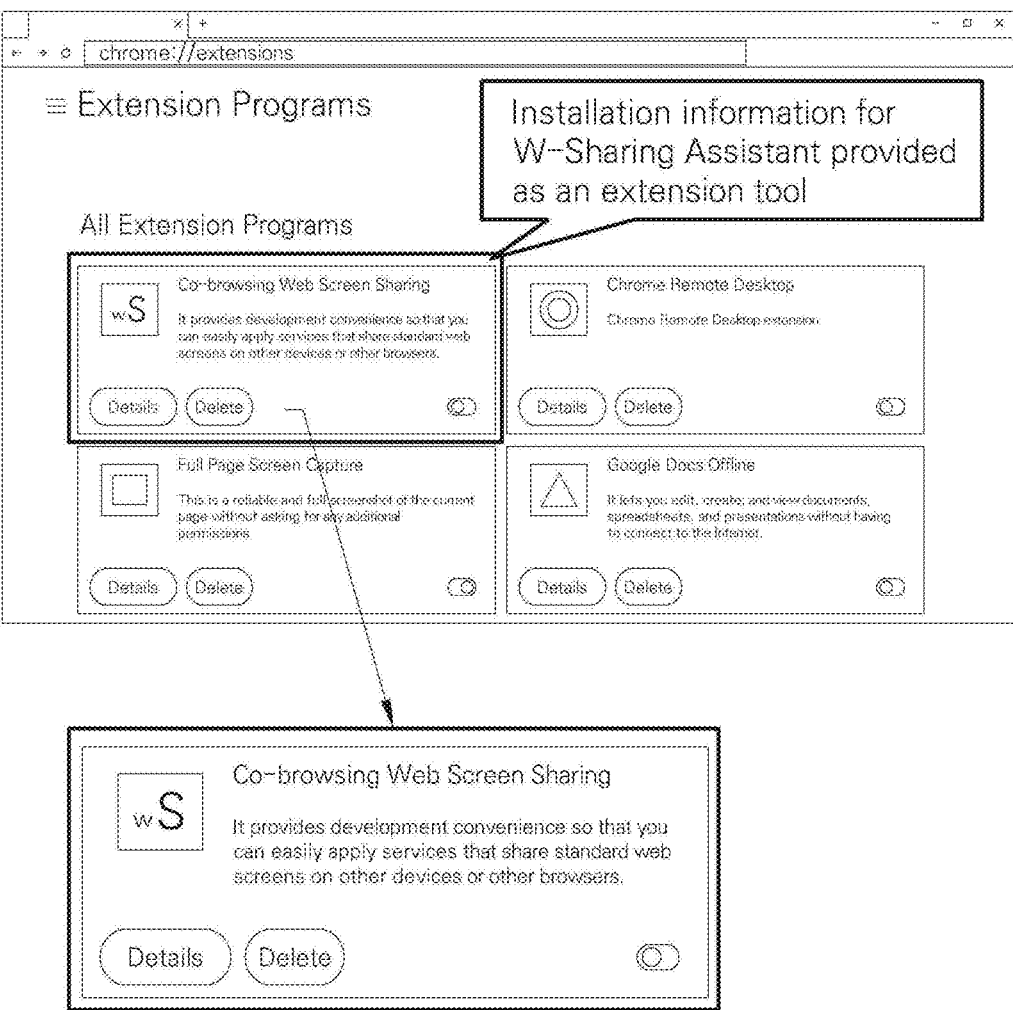
FIG. 5 shows the installation information of the screen sharing assistant (W-Sharing Assistant) provided as an extension tool after it is installed on a web browser.

FIG. 5 shows the installation information of the screen sharing assistant (W-Sharing Assistant) provided as an extension tool after it is installed on a web browser. It explains that it provides development convenience that makes it easy to apply a service for sharing a standard web screen on other devices or other browsers.

Figure 6:
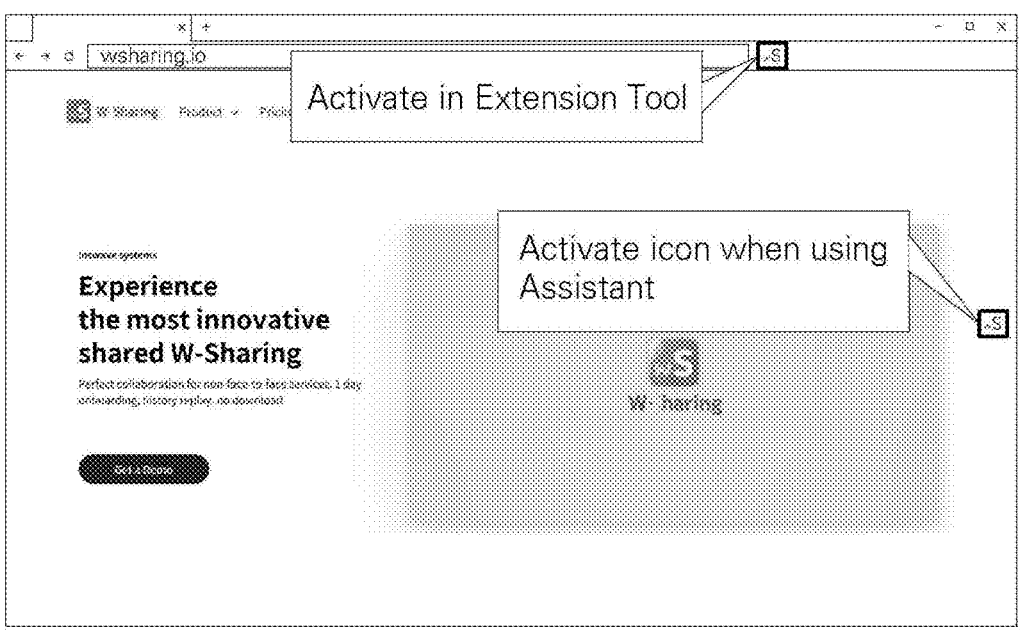
FIG. 6 shows an icon added to the menu bar of a web browser after the screen sharing assistant provided as an extension tool is installed.

FIG. 6 shows an icon added to the menu bar of a web browser after the screen sharing assistant provided as an extension tool is installed. The icon can be activated when the assistant is used.

Figure 7:
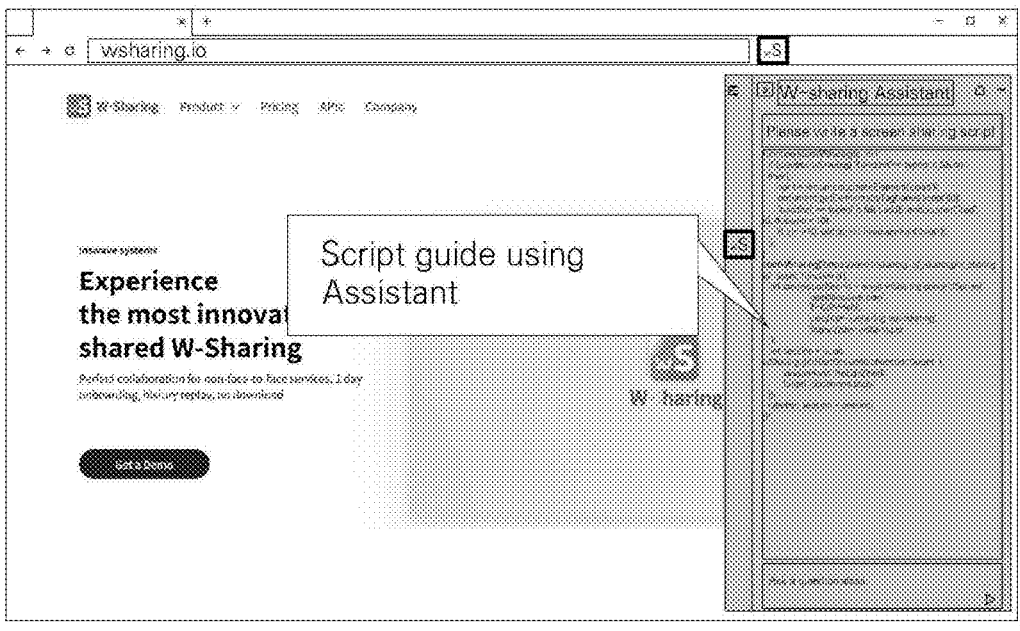
FIG. 7 is an example of the screen sharing script using the screen sharing assistant.

FIG. 7 is an example of the screen sharing script using the screen sharing assistant. Sharing start API code, sharing end API code, various service scripts, connection URLs, etc. for screen sharing of the screen of the web browser can be automatically generated and provided.

In addition, an AI-based chatbot may be integrated into the screen sharing assistant to search for and provide the best answer to a user query regarding modifications and supplements to the automatically generated screen sharing script in connection with LLM.

The AI-based chatbot operates as follows.

According to an API request for the user query received from the chat client, the user query can be classified into a corresponding category. The chat client is a web interface for providing chat with the user (see FIG. 7). It also communicates with the screen sharing service server 10, especially an AI chatbot response unit 14, requests the user query, and receives a response accordingly.

The AI chatbot response unit 14 is configured to generate a work plan based on the initial user query and, according to the work plan, sequentially query and respond to the LLM (Large Language Model) to generate a response to the initial user query.

The AI chatbot response unit 14 includes an API gateway, which is a Rest API controller, and is configured to classify the user query into categories for the user query, generate a context by, and execute individual services. The context information corresponding to the user query can be called through a database search to generate the context.

A prompt for LLM may be generated by calling a service module according to the category and adding the context to a service-specific prompt provided by the service module. The prompt for LLM may then be queried to an LLM through an LLM interface and receive a response. The AI chatbot response unit 14 may verify the validity of the response and then provide the response to the user's query to the chat client.

In this embodiment, the category is a screen sharing category, and the called service module is configured to receive parameter values corresponding to the screen sharing function request and provide a result processed through the LLM as a response. The response may be a JSON string required for executing the screen sharing API.

FIGS. 8 through 13 show items of the screen sharing service through the extension tool. FIG. 8 exemplarily illustrates the non-face-to-face remote work processing system through screen sharing, FIG. 9 exemplarily illustrates full sharing and partial sharing, FIG. 10 exemplarily illustrates signature data sharing, FIG. 11 exemplarily illustrates image and voice data sharing, FIG. 12 exemplarily illustrates history logging and replay function, and FIG. 13 exemplarily illustrates multiple sharing.

Referring to FIG. 8, some area 55 of the terminal screen 50 of the sharing user can be set as a shared screen, and the shared screen 65 may be displayed on the screen of network-connected viewer terminal 60. In one embodiment, in addition to such screen sharing, data sharing and event sharing are also possible, and annotation functions can also be provided.

In one embodiment, the user interface sharing may include the following:

Full sharing of web page: A function to share the entire user's web page with other users, Partial sharing of web page: A function to share a partial area of the user's web page with other users (see FIG. 8), Data sharing: A function to transfer data between shared devices, signature data sharing, History logging & replay: A function to log and replay the history of actions on a shared screen, Multi-party collaboration: A plurality of users can interactively control and update the shared screen, Event sharing: A function to share events such as touch/click/input on a shared screen, and Annotation function: Supporting collaboration through highlighter and/or annotation on a shared screen.

Referring to FIG. 9, the concept of full sharing and partial sharing is illustrated.

In the case of full sharing, the whole page 52 implemented on the Web is shared 62. The sharing user terminal and the viewer user terminal share the same content. The sharing user and the viewer user may be implemented to have control over the entire shared page.

In the case of partial sharing, only a part of the page 55 implemented on the Web is shared 65. By sharing only some areas, only the contents necessary for security or work can be shared. The sharing user and the viewer user may be implemented to be controlled for some areas that are shared.

Referring to FIG. 10, the concept of signature data transmission is illustrated.

When a handwritten signature is to be obtained from a viewer user at the sharing user terminal 50 processing work, if a partial area (signature area) requiring a handwritten signature is selected, a view for writing a signature is provided on the viewer screen (viewer user terminal screen) and a handwritten signature can be entered using a pen function.

The view for writing a signature may include a pop-up window 67 that runs on the viewer screen for entering a handwritten signature. In the screen shared on the viewer screen by full sharing or partial sharing, the area in which a signature is to be handwritten may be displayed small due to the screen ratio. Therefore, by displaying the pop-up window 67, the viewer user can be made more clearly aware of the area that is currently required to be entered and can enter accurate signature data.

In this way, a signed electronic document can be stored by the real-time signature function in a user interface sharing situation.

Referring to FIG. 11, the concept of transmitting photo and voice data is illustrated.

The viewer user terminal may be a mobile terminal. In this case, the appearance (e.g., face, etc.) of the viewer user can be captured and the image data can be transmitted to the sharing user terminal by linking an image capturing function using the camera provided in the viewer user terminal.

Or, by linking the recording function using the microphone provided in the viewer user terminal, the voice of the viewer user can be acquired and the voice data can be transmitted to the sharing user terminal.

Here, the image data can be used for identity authentication in connection with documents (e.g., contract documents) being created through user interface sharing.

The voice data is data recorded as the contractor's voice reading important phrases in the contract document, and can also be used for identity authentication.

Referring to FIG. 12, the concept of history logging and replay is illustrated.

When the user interface sharing function is used, the history logging and replay functions can be provided. When the sharing user terminal and the viewer user terminal are connected and the user interface sharing function is activated, the history recording related to the sharing processing information (such as the combination of the shared screen and the occurrence event (user actions such as clicks, mouse movements, input, signature, and annotation processing)) can be started and stopped for a specific period of time, that is, a preset period of time, or depending on whether a pre-specified event occurs.

At this time, the screen sharing execution unit 13 acts as a broker server and stores the history record relating to the sharing processing information in the database.

The history record can be replayed upon request. The replay is a playback of sharing processing information over time from the start of the history recording to the end of the history recording, which can be provided by displaying the shared screen and reproducing the occurrence event.

For example, in a non-face-to-face work where a multi-page contract document needs to be reviewed and signed, a series of steps from the time of input by the sharing user or the viewer user occurs to the time of completion of the final contract document is completed can be recorded as history. These history records can be viewed via replay to verify that the contract was properly executed.

By allowing filter levels, filter targets, and storage periods to be set as options for history records, unrestricted replay and replay by unauthorized parties can be prevented.

In the history recording, the terminal's sharing module 76 may be configured for operating the front camera on at least one of the sharing user terminal and the viewer user terminal to capture the sharing user or viewer user at a random time unknown to the sharing user or viewer user, and to attach the captured image data and the capture time information to the history record as authentication data and to store them together.

This can be accomplished by overlaying or displaying image data captured at the capture time in a separate area on the shared screen that is later played back when replaying the history record, thus confirming the user's identity in that sharing function.

For example, let's assume a situation in which an employee and a customer are signing an insurance contract non-face-to-face through the user interface sharing function. A typical insurance contract requires the employee to share a number of contract-related pages with the customer on the screen and to obtain a handwritten signature from the customer. This series of steps is recorded as the history record through the history logging function, so that it is possible to determine whether the insurance contract was signed correctly.

In addition, the camera on the customer's device can be used to capture the signer's face at the moment of signing, or at the moment of agreeing to and confirming the signature material, so that it can be verified that the signature was made by someone other than the customer, thereby preventing unfair contracts from being concluded in advance or serving as strong evidence in the event that the legitimacy of the contract is disputed even after the contract has been entered into. In addition, important phrases can be read along, and the recorded voice data can be acquired and attached as authentication data to the history record.

These signature documents, image data, and voice data can be encrypted in their original form and stored and managed in a database.

In addition, FIG. 13 illustrates the concept of a multi-viewer function.

The content shared by a sharing user using a terminal can be shared by a plurality of viewer users using their own terminals.

Some viewer user terminals are provided only in a simple viewer mode, and only a designated viewer user terminal can be set to a collaboration mode with the sharing user terminal, so that functions such as modifying and annotating the shared content can be applied.

FIG. 14 exemplarily illustrates a screen sharing service.

Customer and customer service representative (CSR) can access the screen sharing service server using their own user terminals. In this case, a public line is used, and the screen sharing service web server (W-Sharing Web server) is accessed through a firewall and a load balancer (LB). The load balancer is a server configured to distribute traffic across multiple servers in order to address issues such as server overload and response delays that may occur due to high traffic generated by internet services, such as the screen sharing service according to the present embodiment.

A mirroring screen sharing module is configured as follows.

W-Sharing Web server belongs to the DMZ (DeMilitarized Zone). The DMZ is a subnet positioned between the external network and the internal network, which provides external network services while protecting the internal network. In other words, it is a server zone that is open to the outside. Firewalls can be installed on both sides of the DMZ. One firewall is connected to the internal network, and the other is connected to the external network.

W-Sharing Web server transmits HTML documents or objects (images, files, etc.) requested by a web browser via HTTP or HTTPS. W-Sharing Web server is only responsible for reverse proxy processing.

Reverse proxy performs the function of transmitting data without processing.

W-Sharing WAS performs a function of receiving and processing the requested screen sharing service message. It corresponds to the screen sharing execution unit 13.

Sharing Engine is a screen sharing application that runs on the screen sharing service WAS.

JAVA package is a software package consisting of tools necessary for developing and executing Java-based software.

Mirroring recording module is configured as follows.

Record WAS is a server that performs the service of recording the shared content in the screen sharing service. Logging Engine is an application that performs the service of recording the shared content of the screen sharing service.

Message Queue is a message broker that performs the function of delegating the request to another API and providing a quick response when a message is transmitted to many users or the processing time due to the request is long.

Record service performs the management function and the video streaming function.

The screen sharing service providing system and method using extension tool according to one embodiment may be utilized as follows.

In the digital environment of the financial sector based on the digital transformation, financial sales staff can collaborate and share tasks such as electronic signatures, financial product design, and payment requests between customers and employees in environments such as ODS (Out Door Sales) and mobile branch regardless of device types.

When building a warship combat system where security is essential in the defense field, it enables access and control of various hardware such as weapons and sensors, supports high-level security requirements, and supports offline operation to ensure normal operation in case of network disconnection.

In the field of e-learning, it is possible to enable the interaction between the teacher and the student to provide an e-learning service by sharing the teacher's teaching and course contents with the remote student's terminal. By sharing the electronic blackboard and the terminals of students, collaborative classes through two-way communication are possible, and interactive collaborative classes between teachers and students can be made by using the push function.

As a public service for the public, it is possible to share a kiosk for self-authentication when entering/exiting an airport/port, an unmanned certificate issuing machine, and so on with the customer's terminal environment, and the governmental agencies' face-to-face/non-face-to-face sharing services become possible.

In the digital twin-based manufacturing environment, the dynamic simulation of physical objects and systems can be digitized with a focus on the manufacturing field, and the user terminal environment for the simulation of the design, operation, and maintenance of production facilities, and virtualization training of field workers can be performed through collaboration and sharing.

In the digital medical field, it can be used to build a telemedicine system that supports real-time sharing of biometric information collected through IoT devices, and interworking with medical devices and EMR (Electronic Medical Record) systems can be used.

In the collaborative software development environment, shared development tools that enable knowledge sharing and real-time code review in collaboration, co-ownership, and horizontal relationships can be supported.

In the call center sector, non-face-to-face support can be provided by using calls and sharing services when requesting help while using an application. CSR can share the customer's screen through a sharing service to check a question and use a screen guide function to provide guidance. It may be easier and faster than dealing with customers only via phone or messaging.

FIG. 15 exemplarily illustrates the configuration of a system according to one embodiment of the present invention.

Referring to FIG. 15, the screen sharing service server 10 may include a processor 410 and a memory 420. The memory 420 may store one or more instructions executable by the processor 410. The processor 410 may execute the one or more instructions stored in the memory 420. By executing the instructions, the processor 410 can perform one or more of the operations described above with reference to FIGS. 2 through 14. Additionally, a configuration of the present invention described above with reference to FIG. 1 may be a configuration implemented by instructions executed by the processor 410.

The aforementioned screen sharing service providing method may also be implemented in the form of a recording medium including computer-executable instructions, such as an application or program module executed by a computer. The computer-readable medium can be any available medium that can be accessed by a computer, and includes both volatile and non-volatile media, and removable and non-removable media. Further, the computer-readable medium may include a computer storage medium. The computer storage medium includes both volatile and non-volatile, removable and non-removable media implemented with any method or technology for storing information such as computer-readable instructions, data structures, program modules, or other data.

The aforementioned screen sharing service providing method (which may include programs included in platforms or operating systems that are basically installed in the terminal), or it may be executed by an application (i.e., a program) installed by the user directly on the master terminal through an application delivery server, such as an application store server, an application or a web server associated with such a service. In this sense, the aforementioned screen sharing service providing method may be implemented by an application (i.e., a program) installed by default on the terminal or installed directly by the user, and recorded on a computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A non-transitory computer-readable medium storing computer executable instructions for performing a screen sharing service providing method using extension tool when executed by a computer, the method comprising:

registering a screen sharing-related extension tool in an extension tool registration unit of a web browsing service server in an extension tool providing unit of a screen sharing service server;

receiving a screen sharing request according to an execution of the screen sharing-related extension tool installed in a first user terminal in a request receiving unit of the screen sharing service server;

transmitting a message for notifying screen sharing request to a second user terminal corresponding to the screen sharing request in a screen sharing execution unit of the screen sharing service server;

receiving a message for notifying screen sharing available state from the second user terminal in the screen sharing execution unit; and transmitting the message for notifying screen sharing available state from the screen sharing execution unit to the first user terminal, thereby establishing a connection for screen sharing between the first user terminal and the second user terminal, wherein the screen sharing-related extension tool is an extension program installed in a web browser of the first user terminal, and enables the contents displayed on the screen of the web browser with the second user terminal, wherein the first user terminal requests the web browsing service server for the screen sharing-related extension tool for installation in the web browser and receives the screen sharing-related extension tool, and wherein when the screen sharing-related extension tool is executed on the first user terminal, further comprises:

installing a screen sharing assistant;

automatically generating a screen sharing script using a screen sharing API in the screen sharing assistant; and providing a customized screen sharing script customized to the contents displayed on the screen of the web browser, based on a response provided in connection with an LLM to a user query for modification of the screen sharing script input through a chat client provided by the screen sharing assistant.

2. The non-transitory computer-readable medium of claim 1, further comprising:

receiving the user query through the chat client provided by the screen sharing assistant;

generating a context by calling context information corresponding to a category corresponding to the user query;

generating a prompt for LLM by calling a service module according to the category and adding the context to a service-specific prompt provided by the service module;

querying a large language model for the LLM prompt through an LLM interface and receiving a response accordingly; and after validating the response, providing the response to the chat client as a response to the user query.

3. The non-transitory computer-readable medium of claim 1, wherein the screen sharing script comprises at least one of a sharing start API code, a connection URL, a service providing script, and a sharing end API code.

4. The non-transitory computer-readable medium of claim 2, wherein the category is a screen sharing category, the called service module receives a parameter value corresponding to a screen sharing function request, and the response is a JSON string required for executing the screen sharing API as a result processed through LLM.

5. The non-transitory computer-readable medium of claim 1, wherein the transmitting a message for notifying screen sharing request to a second user terminal provides a connection URL included in the screen sharing script, and wherein the second user terminal transmits the message for notifying screen sharing available state after accessing a web page through the connection URL.

* * * * *